(12) United States Patent
Przywecki

(10) Patent No.: US 7,615,879 B2
(45) Date of Patent: Nov. 10, 2009

(54) METHOD OF CONTROLLING AN ONBOARD POWER SUPPLY SYSTEM FOR A MOTOR VEHICLE

(75) Inventor: Frank Przywecki, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 90 days.

(21) Appl. No.: 11/634,979

(22) Filed: Dec. 7, 2006

(65) Prior Publication Data

US 2007/0141999 A1 Jun. 21, 2007

(30) Foreign Application Priority Data

Dec. 16, 2005 (DE) .................. 102 005 060 129

(51) Int. Cl.
*H02J 1/14* (2006.01)
(52) U.S. Cl. .................................. 290/40 C; 322/28
(58) Field of Classification Search ............... 290/40 C
See application file for complete search history.

(56) References Cited

U.S. PATENT DOCUMENTS

| | | | | |
|---|---|---|---|---|
| 4,973,896 | A * | 11/1990 | Shiga et al. | 322/28 |
| 5,132,893 | A * | 7/1992 | Klein et al. | 363/49 |
| 5,483,146 | A * | 1/1996 | Schultz et al. | 322/7 |
| 6,111,768 | A * | 8/2000 | Curtiss | 363/98 |
| 6,717,416 | B2 * | 4/2004 | Koernle et al. | 324/537 |
| 6,900,554 | B1 * | 5/2005 | Winkler | 307/10.1 |
| 7,176,658 | B2 * | 2/2007 | Quazi et al. | 322/24 |
| 7,327,123 | B2 * | 2/2008 | Faberman et al. | 322/37 |
| 2001/0030468 | A1 * | 10/2001 | Anderson et al. | 307/31 |
| 2004/0112320 | A1 * | 6/2004 | Bolz et al. | 123/179.28 |
| 2004/0217723 | A1 * | 11/2004 | Cai et al. | 318/268 |
| 2006/0145536 | A1 * | 7/2006 | Hackl et al. | 307/10.1 |

FOREIGN PATENT DOCUMENTS

| | | | |
|---|---|---|---|
| DE | 4007526 A1 * | 9/1991 | |
| DE | 199 31 144 A1 | 7/2000 | |
| DE | 101 45 270 A1 | 4/2003 | |
| DE | 102 62 000 A1 | 2/2004 | |

(Continued)

OTHER PUBLICATIONS

Crowell & Moring Fascimille Jun. 26, 2009, 2 pages.*

(Continued)

*Primary Examiner*—Joseph Waks
(74) *Attorney, Agent, or Firm*—Crowell & Moring LLP

(57) ABSTRACT

A method is provided for controlling an onboard power supply system for a motor vehicle having a multi-voltage generator which supplies at least a first and a second partial power supply system having in each case several electric consuming devices, the first and the second partial power supply system having a first and a second voltage respectively and being mutually coupled by way of a parallel connection consisting of a voltage converter and a longitudinal controller. In order to optimally utilize the offered electric power and ensure the supplying of power to large consuming devices, such as the windshield heating system, a separate priority is in each case assigned to the several electric consuming devices, and the electric consuming devices are supplied as a function of their respective priority, so that the sum of the consuming device powers does not exceed a defined power value of the generator.

10 Claims, 3 Drawing Sheets

FOREIGN PATENT DOCUMENTS

| | | | |
|---|---|---|---|
| DE | 10231517 | A1 * | 2/2004 |
| DE | 103 41 907 | A1 | 4/2005 |
| EP | 985584 | A2 * | 3/2000 |
| JP | 04017600 | A * | 1/1992 |
| WO | WO 2087053 | A1 * | 10/2002 |

OTHER PUBLICATIONS

German Search Report dated Jul. 3, 2006 with English translation of relevant portion (Nine (9) pages).

* cited by examiner

METHOD OF CONTROLLING AN ONBOARD POWER SUPPLY SYSTEM FOR A MOTOR VEHICLE

BACKGROUND AND SUMMARY OF THE INVENTION

This application claims priority under 35 U.S.C. § 119 to German Patent Application No. DE 10 2005 060 129.4, filed Dec. 16, 2005, the entire disclosure of which is herein expressly incorporated by reference.

The invention relates to a method of controlling an onboard power supply system in a motor vehicle having a multi-voltage generator which supplies at least a first and a second partial power supply system each having several electric consuming devices, the first and the second partial power supply system having a first and a second voltage respectively and being mutually coupled by way of a parallel connection consisting of a voltage converter and a longitudinal controller.

Onboard power supply systems for motor vehicles developed in recent years having a second voltage level in addition to a first voltage level for supplying different consuming devices by way of a supply system. In these systems the first and the second voltage levels are mutually coupled by way of a voltage converter. Consuming devices with a low power consumption are connected to the first partial power supply system with the lower nominal voltage (e.g., 14 volts), and high-power consuming devices, (such as heaters, an electric power steering system, electromotive brakes, etc.) are connected to the second partial power supply system with the higher nominal voltage (e.g., 42 volts). In critical operating situations (for example, a surge operation), low-voltage consuming devices can optionally be supplied from the second partial power supply system.

The two partial power supply systems are supplied with electric power by a generator, such as a multi-voltage generator (MVG) which, depending on the voltage applied to its exciting coil, generates a high or a low voltage. While the generator supplies the partial power supply system with a higher or variable voltage directly, the supply to the partial power supply system with the low voltage takes place by a regulated voltage (DC-DC) converter. When the supplying the partial power supply system with a high or variable voltage is no longer required, the generator is regulated back to the lower voltage of the second partial power supply system and the voltage converter is connected.

The construction and manufacturing of voltage converters require high expenditures, and the required components, such as filter capacitors and battery supply coils, are not suitable for high temperatures. In addition, measures have to be taken for the interference suppression because high currents with very steep edges are switched in DC-DC converters. The size of the DC-DC converters has to be designed for a maximal power, although the maximal power needs to rarely be switched in a motor vehicle.

One solution is to provide a longitudinal controller parallel to the voltage converter in order to relieve the DC-DC converter and therefore allow it to be smaller and more cost-effective. Longitudinal controllers are robust and have a high temperature resistance. They can be cooled by means of the engine cooling water, and their interference emission is low.

Such a construction is disclosed in German Patent Document DE 102 62 000. This document discloses an onboard power supply system for a motor vehicle having at least a first and a second voltage level and a generator, the first and the second voltage level being mutually coupled by way of a first coupling device and the first coupling device comprising a longitudinal controller. The onboard power supply system comprises a first regulating device which triggers the longitudinal controller while taking into account the future loading of the second voltage level.

However, during idling the problem arises that the generator provides only a little more power than a normal 14-volt generator. The power of the generator will rise until the maximal voltage or power has been reached only when the rotational speed is increased. Accordingly, because the power of the generator depends on the rotational engine speed all consuming devices cannot be simultaneously supplied in any operating condition of the vehicle.

The electric power therefore has to be distributed as intelligently as possible, while safety, legal regulations and comfort definitions have to be taken into account. In particular, this necessity becomes noticeable due to, for example, windshield heating devices. A windshield heating device comprising a vapor-coated foil cannot be operated at 14 volts because the resistance of the foil cannot be reduced arbitrarily. When the voltage is too low there is insufficient power and the defrosting function is limited. Although the generator can provide more power as a result of the additional degree of freedom of the variable voltage, the maximal power is also limited during the idling. A windshield heating device can therefore be operated only by use of an intelligent distribution of power due to the variable generator voltage in the range close to idling.

It is an object of the present invention to provide a method which ensures the optimal utilization of the offered electric power and, in particular, ensures the supplying of large consuming devices, such as the windshield heating device.

This oject is achieved by a method of controlling an onboard power supply system that assigns a separate priority to the several electric consuming devices of the first and second partial power supplies and supplies the electric consuming devices as a function of their respective priority in such a way that the sum of the consuming device powers does not exceed a defined power value of the generator.

The object according to the invention is achieved by creating an intelligent power distribution in which the individual consuming devices are provided with a supply priority. In other words, a "prioritization" is implemented. The basis of this prioritization is a momentary generator power, and this generator power is optimally distributed to the connected consuming devices.

The method according to the invention of controlling an onboard power supply system for a motor vehicle having a multi-voltage generator, which supplies at least a first and a second partial power supply system having, in each case, several electric consuming devices, the first and the second partial power supply system having a first or a second voltage and being mutually coupled by way of a parallel connection consisting of a voltage converter and a longitudinal controller, involves assigning a separate priority respectively to the several electric consuming devices, and supplying the electric consuming devices as a function of their respective priority, so that the sum of the consuming device powers does not exceed a defined power value of the generator.

In particular, one or several of the following characteristics are implemented:

An old consuming device is replaced by a new consuming device
   if the priority of the old consuming device is below the priority of the new consuming device, and
   the sum of the consuming device powers, including of the new consuming device, exceeds the defined power value;

the power value of the generator corresponds to the momentary power of the generator;

the power value of the generator corresponds to the sum of the consuming device powers to the extent that the priority of the consuming devices is above a defined threshold priority, the generator power being raised by at least one of the following steps:

Boosting of the generator,
adapting the rotational idling speed of the engine, and
boosting the voltage converter;

the priority of the consuming devices is dynamically determined as a function of driving and environmental parameters.

In this case, the boosting of the generator means that the latter is overloaded in the cold condition and the voltage is superelevated at the exciting winding of the generator. The adaptation of the rotational idling speed essentially raises the rotational idling speed in order to correspondingly increase the voltage of the generator. The boosting of the voltage converter is also achieved by an intentional overloading of the converter in the cold condition.

The invention has the advantage, among others, that the possibility is created of being able to electrically heat a windshield to which a vapor-coated foil is glued, even if the power output of the generator is at the lower limit. Furthermore, the interior can be heated more rapidly than by means of a heating/PTC technique according to the state of the art. In addition, when recuperative power is used for the catalyst heating, the vehicle occupant compartment heating, the windshield heating, and the conventional electric onboard power supply system is not loaded as much. As a result, the charging balance of the battery will improve with a simultaneous increase of the service life of the battery by a reduced cyclization. The air-conditioning comfort is also improved because a higher electric power is also available in the low rotational engine speed range. Safety is also improved because the windshield heating device is supplied while the comfort is very high.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
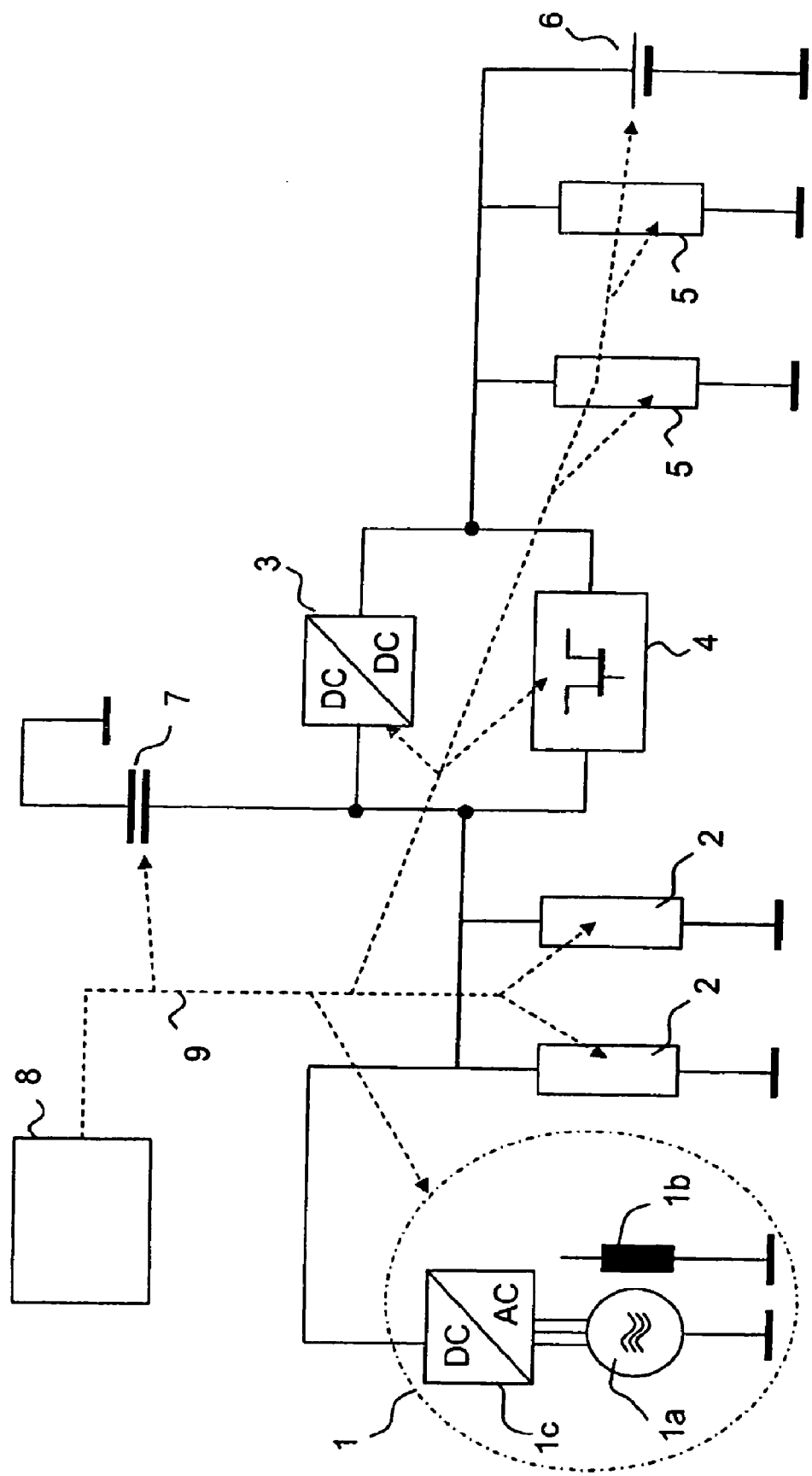
FIG. 1 is a schematic view of the circuit diagram of an onboard power supply system according to the state of the art.

FIG. 1 illustrates an onboard power supply system of a motor vehicle according to the state of the art. In this onboard power supply system, a generator in a generator-engine unit 1 generates the supply voltage and supplies the current for the consuming devices connected to the power supply system. The generator-engine unit 1 includes an electric machine 1a having an exciting coil 1b, as well as a bidirectional AC/DC converter 1c. Because of the bidirectional converter 1c, the generator-engine unit 1 can be operated as a generator or as an engine. The engine is utilized as the starter in the belt drive.

The output voltage and the output power of the generator 1a can be controlled by way of the exciting coil 1b. In FIG. 1, two consuming devices 2 are connected to the power supply system, which is supplied by the generator. The consuming devices 2 require a voltage that is generated directly by the generator. These are, for example, a windshield heating device and a PTC heating element. Generally, consuming devices for which voltage fluctuations do not impair operating functions but can affect comfort are connected with the power supply system supplied directly by the generator 1a. In the case of these consuming devices, a large control range between 14 and 42 v is therefore available in which the generator can be operated.

Other consuming devices on an onboard power supply system of a motor vehicle react more sensitively to voltage fluctuations, and therefore have to be operated in a separate, more stable power supply system. This second power supply system is coupled with the first power supply system by a voltage converter 3, which is illustrated as DC/DC in FIG. 1 and will referred to as such in the following. The DC/DC converter is used mainly for the basic supply to the second partial power supply system as long as the voltage of the first power supply system is higher than the voltage of the second power supply system. As a rule, the voltage converter is not designed for power peaks. The voltage converter is switched off when the voltages of both power supply systems are identical. A longitudinal controller 4 is connected parallel to this voltage converter 3, and the longitudinal controller 4 provides the corresponding power if the demand exceeds the basic demand.

The consuming devices 5 in the second power supply system demand a constant supply voltage, and have a relatively constant power demand.

Special consuming devices in the motor vehicle are represented by the charging of a battery 6 or the charging of a storage capacity 7. While the charging operation and the current output in the case of the battery, as a rule, take place in a more uniform manner, the storage capacity 7 is used for the short-term closing of supply gaps. Under certain circumstances, it should be possible to charge the latter rapidly and intensively. Therefore, the battery 6 is connected with the second partial power supply system, by which the consuming devices with a more constant demand are supplied. In contrast, the storage capacity is connected directly with the generator 1a, as also, for example, the windshield heating device, etc.

In the first partial power supply system directly connected with the generator 1a, the voltage can be additionally raised particularly for charging the storage capacity 7. Independently of this raising of the voltage in the first power supply system, the second power supply system is supplied with the second voltage by the DC/DC converter 3 and the longitudinal controller 4, which second voltage is maintained in a constant manner.

Controlling of the onboard power supply system by way of the generator 1a takes place by a control system 8. By way of control lines 9, the control system 8 is connected with the individual consuming devices 2, 5, 6 and 7 in order to connect or disconnect the latter, as required.

In order to control its power output, the control system 8 is connected with the generator-engine unit 1 by way of the control lines 9. In order to ensure the supplying of the second partial power supply system at the required constancy, the control system 8 is connected with the converter 3 and the longitudinal controller 4. The control lines 9 are shown as broken lines in order to differentiate them from current-carrying lines.

The control system 8 regulates the power output of the generator 1a by way of the exciting coil 1b. When a high voltage is needed in the first partial power supply system with the consuming devices 2, by way of the control system 8, a high voltage is applied to the exciting coil 1b. When, in contrast, a lower voltage is needed in the first partial power supply system, the voltage is reduced by way of the exciting coil 1b.

The control system 8 prevents the first and second partial power supply systems from breaking down in the event of an overloading. In order to avoid that, one or more consuming devices are removed from the power supply system. For reasons of clarity, the corresponding switches of the individual consuming devices, etc. are not shown in FIG. 1.

Particularly high demands are made on the power supply when the generator-engine unit 1 is operated as a starter generator in the belt drive (SGR). In this case, the converter 1c in the generator-engine unit 1 converts the direct current from the battery 6 or the storage capacity 7 to an alternating current. A switch-over between the two operating modes, specifically the generator operation and the engine operation, can take place by means of the control system 8. The power for driving the engine and for starting is provided by the storage capacity 7. The storage capacity 7 can additionally be charged by the bidirectionally operating DC/DC converter 3 from the battery 6. When the power of the storage capacity 7 is not sufficient for starting, it is possible to obtain the power for the start by way of the starter-generator in the belt drive (SGR) by way of the (not shown) parasitic diodes in the longitudinal controller 4 from the battery 6 as soon as the voltage at the storage capacity 7 falls below the battery voltage. For internal-combustion engines with an additional pinion starter for the cold start, the SGR can be used for assisting the cold start.

Figure 2:
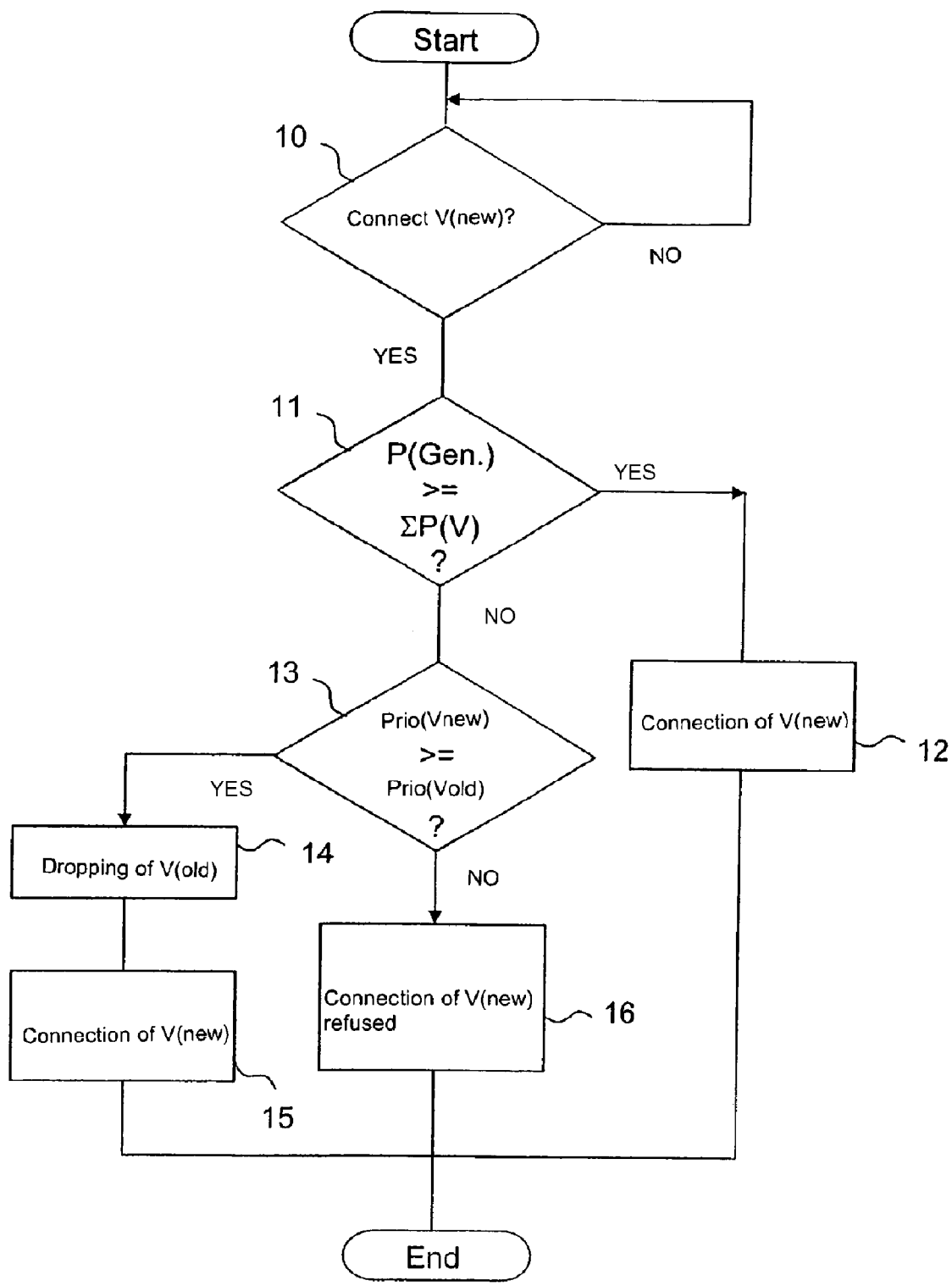
FIG. 2 is a schematic view of an embodiment of the method according to the invention in the form of a flow chart.
Figure 3:
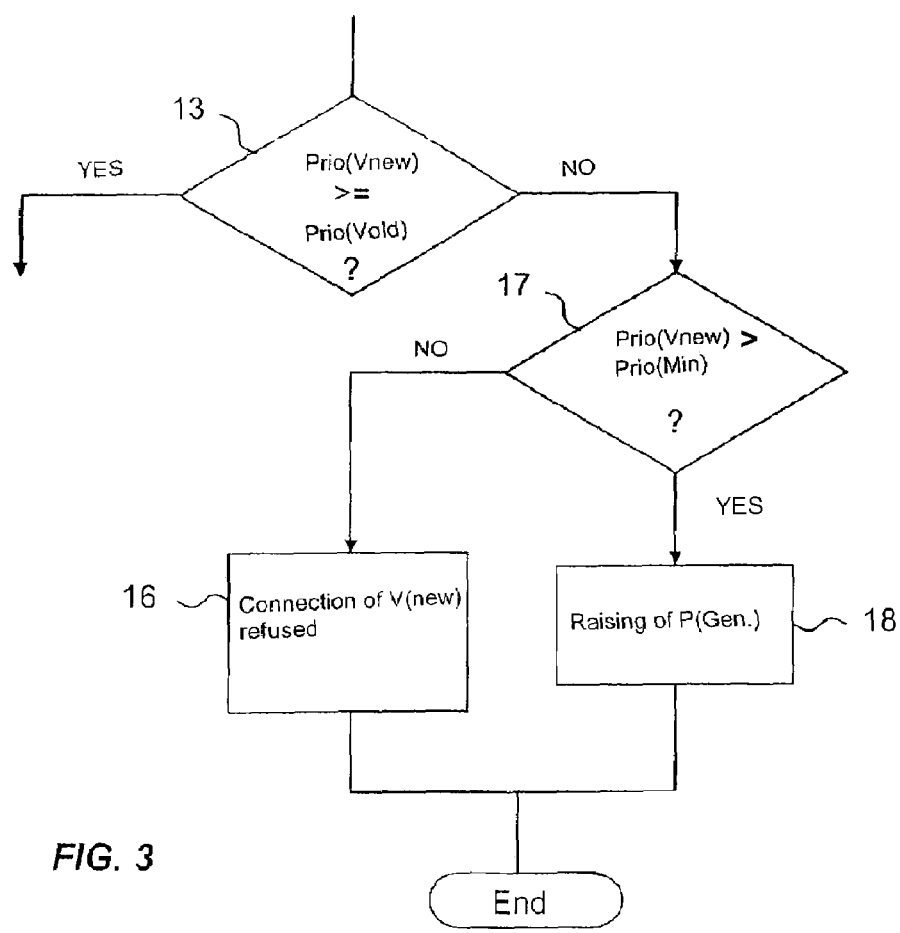
FIG. 3 is a view of another embodiment of the method according to the invention.

FIGS. 2 and 3 provide methods for best utilizing the power provided by the generator 1a.

FIG. 2 illustrates a process for distributing the electric power in an onboard power supply system of a motor vehicle. In principle, the method is based on the supply assigning a priority to all electric consuming devices. Then it is determined in Step 10 whether a new consuming device should be connected, as a first consuming device at all or as a further consuming device in addition to already supplied consuming devices. If no new consuming device V(new) is to be connected, the process returns to the start after Step 10.

If, in contrast, it is recognized in the first Step 10 that a new consuming device V(new) is to be connected, for example, because the operation of a corresponding key by the driver was detected, it is determined in Step 11 whether the electric power generated by the generator is sufficient for supplying all consuming devices, i.e., all already supplied consuming device and, in addition, the consuming device to be additionally newly connected. Specifically, in Step 11 it is determined whether a defined power value of the generator would be exceeded by the connecting of the new consuming device. In the embodiment illustrated in FIG. 2, the defined power value is the momentary generator power P(Gen). If the latter is greater than or at least equal to the sum of all consuming device powers, including the future consuming device, (i.e., if P(Gen)>ΣP(V)), then the new consuming device will be connected in Step 12, and the process is terminated. In this situation there will be no conflict.

However, if it is determined in Step 11 that the demanded power of the generator exceeds the defined power value of the generator, i.e., that the power value of the generator is not sufficient for the supplying of all consuming devices which are already connected with the power supply system or are still to be connected, the process skips to Step 13, in which the priority of the individual consuming devices is checked. The priority defines which consuming devices have priority with respect to being supplied and which consuming devices do not necessarily have to be supplied. This priority can be defined ahead of time for each device. However, in a preferred embodiment of the method according to the invention described below, it is dynamically calculated for each device, so that changed driving situations can be taken into account in each case.

In Step 13, the priority of the newly added device is compared with that of all other already supplied devices. If it is determined that the newly added device has a higher priority than at least one of the already supplied devices, the device with the lower priority is removed from the power supply system and is replaced by the new device. Both processes are illustrated by the Steps 14 "Dropping of an Old Device", and 15 "Connecting of the New Device" in FIG. 2. The process will then be terminated.

In contrast, if it is determined in Step 13 that the priority of the new device is below that of each of the already connected devices, the connecting of the new device is refused in Step 16. In an exemplary embodiment of the invention, the driver in this case receives a corresponding notice, so that he can make a decision concerning the switching-off of already supplied devices.

In order to avoid the risk that devices cannot be switched on at all in this manner because the supply by the generator is sufficient only for particularly important devices, a minimum priority is introduced in accordance with exemplary embodiments of the method according to the invention. This will be explained in the following in connection with FIG. 3, which is a continuation of FIG. 2 after Step 13.

As a function of the minimum priority Prio(Min), it can be decided whether the power value of the generator has to be adapted. If, for example, a consuming device (E-Kat) has to be operated with the full power or if several consuming devices absolutely have to be switched on, this is recognized by the system by the priorities Prio (Vnew) of all these consuming devices being above the minimum priority Prio (Min). By way of the sum of the consuming device powers, the power value of the generator will then be adjusted corresponding to the sum of the consuming device powers, if the priority of the consuming devices is above the defined minimum priority Prio(Min). The generator power is then raised correspondingly.

In the embodiment according to FIG. 3, in Step 13 it is determined whether the priority of the device Prio (Vnew) to be connected is greater than or equal to the priority of all already supplied devices Prio (Vold). If it is determined in Step 13 that the priority of the device Prio (Vnew) is greater than or equal to the priority of all already supplied devices Prio (Vold), the process skips to a Step 17. In Step 17 a determination is performed as to whether the priority of the new device (and naturally of all "old" devices) is above the minimum priority. If not, the connection of the new device is refused in Step 16, as in the case of the process according to FIG. 2.

If, in contrast, it is determined in Step 17 that all consuming devices, including the consuming device to be newly added, have a higher priority than the minimum priority, the power of the generator 1a is increased in Step 18. This avoids the situation in which absolutely required devices cannot be switched on because other devices already have to be supplied whose priority is relatively high. This applies predominantly to the operation of the engine close to idling when the generator cannot generate its full power.

In Step 18, the following measures can be used for raising the generator power:

Boosting of the generator,
Adapting of the rotational idling speed of the engine, and
Boosting of the voltage converter.

As a result of the first measure, a greater electric power can be provided without increasing the rotational engine speed. In other words, because of the higher torque of the generator while the rotational speed of the engine remains the same, the generator is capable of providing more electric power.

By adapting the rotational idling speed of the engine, the voltage of the generator can be increased, which causes a higher power output of the generator.

Another manner of increasing the output power of the generator is the short-term overloading of the voltage converter. This reduces the current through the longitudinal controller, and thereby simultaneously the power loss in the longitudinal controller. The reduction of the power loss in the longitudinal controller increases the generator voltage. Therefore, more power is available to the first power supply system with a variable voltage.

In the following, the course and the consequences of the method according to the invention will be explained by way of examples from practice. Different vehicle operating conditions are shown together with the respective problems and their remedies.

During the cold start of the vehicle, the engine is in the idling operation for a fairly long time, for example, because the driver first has to remove ice and snow from the windows. In this case, the windshield heating device and a PTC heating device are to be switched on. However, because the operation close to idling the generator cannot supply very high power, and the simultaneous supplying of the above-mentioned consuming devices cannot be achieved in the state of the art.

According to the invention, the priority of the individual consuming devices is checked. In this case, it is determined that the heating of the E-catalyst has priority in order to bring it rapidly to a favorable operating temperature, and thereby ensure good emission values. Therefore, the E-catalyst is first serviced exclusively; all other consuming devices are not yet connected—Step 16 in FIG. 2.

When the control system 8 recognizes that the outside temperature is below 0° C., the priority of the consuming devices is newly determined. In particular, the importance of the windshield heating device is increased in comparison to the E-catalyst. In this case, the priorities of the E-catalyst and the priority of the windshield heating device are above a minimum priority. This is determined in Step 17, FIG. 3, and as a result, the generator power is raised in Step 18—also during the idling. This takes place, for example, by boosting the generator and increasing the rotational speed during the idling. When the generator has increased its output on the basis of these measures, the windshield heating device can be switched on in addition to the E-catalyst.

As an alternative to the raising of the generator power, the generator can be relieved by connecting storage capacity 7 for the purpose of assisting, or the battery 6 can also used. Furthermore, on the part of the onboard power supply system, the loading of parallel connected DC/DC converters and longitudinal controllers can also be varied in order to relieve one of the two. When the longitudinal controller is relieved, the generator voltage increases because of the low heat output of the longitudinal controller into the cooling water, so that the generator power is thereby also increased. When then sufficient power is available, the windshield heating device can be connected.

In order to avoid an unnecessary loading of the generating and take new priorities into account, the measures for raising the generator power are checked after a defined time period. This will be explained below in connection with FIG. 4. Thus, the E-catalyst is switched off after a defined time period and, instead, the windshield heating device is acted upon by the full available power. However, should the entire power not be able to flow into the windshield heating device, individual branches of a PTC element may instead be supplied with power, by way of which additional vehicle sections can be heated.

If the driver starts to move the vehicle after a cold start, it can be concluded that the windshield has been freed of ice and snow and the visual conditions exist for a safe driving. The windshield heating device is therefore no longer rated as a high priority. Since, on the other hand, the interior should be heated as fast as possible by means of PTC heating elements to a desired temperature, the priority of the power supply to the PTC heating elements is assessed to be relatively high. Connecting of the PTC heating elements can therefore take place in Steps 13, 14, 15, unless the generator power is considered to be sufficient anyhow in Step 11.

Fluctuations of the generator power because of fluctuations of the rotational engine speed can be absorbed in that not all PTC branches are switched on simultaneously but in that individual branches of the PTC heating device are connected and disconnected depending on the generator power.

To the extent that a high generator voltage is still required for the windshield heating device, the generator is operated at a maximal utilization despite an increasing rotational speed.

If, after the cold start of the vehicle, the windshield is free and the windshield heating device is therefore off, as a result of the fluctuating rotational speed, the generator voltage and the PTC power can change within a broad range. Thus, the power, which the generator can provide to the PTC heating device during the idling, amounts, for example, to approximately 1 kW thermal output, while it amounts to approximately 4.5 kW at the maximal rotational speed. A higher generator power is obtained during the idling as a result of the above-mentioned boosting functions. Boosting of the generator does not take place above the idling; the DC/DC converter is not operated in the overload range. The higher generator power occurs as a result of the higher rotational speed.

When the rotational engine speed reaches a defined high rotational speed, for example, 1,500 r.p.m, the voltage at the generator rises to such an extent that the PTC power becomes too high and perceptible temperature fluctuations therefore occur. In order to then lower the PTC power, individual PTC branches are switched off or alternately connected and disconnected. The storage capacity 7 is charged by means of the further rising voltage. In addition, in the case of a seat occupation detection, more thermal output can be fed when seats are unoccupied, so that the occupants are not subjected to significant temperature fluctuations.

When the rotational engine speed decreases, all PTC branches are connected and the then full storage capacity is disconnected, so that, during the idling, the maximal buffering by the storage capacity is ensured. During the idling, the charging in the storage capacity will then be available again.

Figure 4:
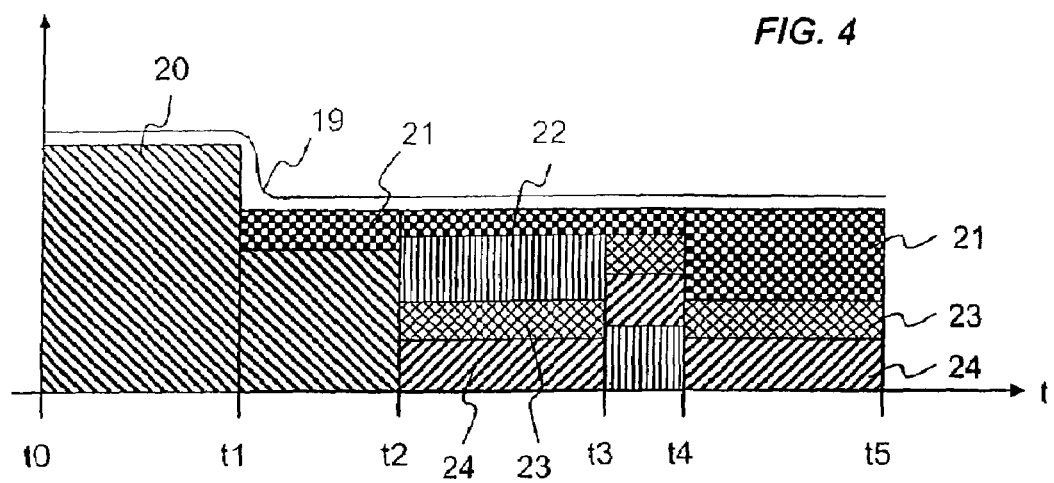
FIG. 4 is a view of the power distribution in the vehicle which occurs according to the method according to the invention.

In FIG. 4, five scenarios are illustrated with respect to the distribution of the generator power to consuming devices.

In a time segment between t0 and t1, only one consuming device is to be supplied with power. However, this consuming device, the E-catalyst, has a high power demand which, under certain circumstances, may even exceed the momentary offered generator power. The power of the generator therefore has to be increased here in order to correspond to the demand, or additional current sources, such as the storage capacity 7 or the battery 6 are to be connected additionally.

Also during the time segment between t1 and t2, the E-catalyst is to be supplied with power as a single consuming device, but here the power demand is lower than the offered power. The excessive power of the generator is therefore used in this case for charging the accumulators or is converted to heat or is used in another form.

Between the times t2 and t3, several consuming devices are on the power supply system. In the illustrated situation, these are, for example, the windshield heating device 21, the air-conditioning system 22 (PTC heating device) and the seat heating system 23, which also do not require the entire power provided by the generator. The priority of the heating devices increases in the upward direction, so that the priority of the air-conditioning system 22 is higher than the priority of the seat heating system 23, and the priority of the windshield heating device 21 is higher than that of the air-conditioning system 22. This corresponds to the situation in the case of the above-described cold start, at which the vehicle is standing (warm-up when idling) and the driver is possibly first removing snow and ice manually from the windshield.

Between the time t3 and the time t4, the same consuming devices are on the power supply system as previously between t2 and t3, but their priority has changed, due to, for example, the vehicle starting to move and the conclusion that the visual conditions have improved. The priority of the windshield heating device is no longer so high. Instead, the interior heating system, i.e., the heating by means of the air-conditioning system 22 is more important and has the highest priority, as well as the operation of the seat heating system 23. Thus, as a result of changed driving and environmental parameters, the priority was newly, that is, dynamically defined. This may be triggered by a shifting operation or the detection of new environmental influences, for example, the temperature rising above a defined threshold value, as a result of which the importance of the heating operation is reduced.

Between t4 and t5, the windshield heating device 22 is switched off, so that now only the air-conditioning system 22 and the seat heating system 23 are still on the power supply system, the excessive power again being used for secondary tasks.

In this manner, by means of the method according to the invention, in all embodiments, the power offered in the power supply system can be utilized intelligently and therefore optimally.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Reference Numbers

1 Generator—engine unit: 1*a* generator, 1*b* exciting coil, 1*c* converter
2 Consuming devices on the first power supply system
3 DC/DC converter
4 Longitudinal controller
5 Consuming devices on the second partial power supply system
6 Battery
7 Storage capacity
8 Control system
9 Control lines
10 Query: should a new consuming device V(new) be connected?
11 Query: is the power sufficient for a new consuming device?
12 Connection of a new consuming device V(new)
13 Query: Is the priority of the new consuming device higher than that of an old consuming device?
14 Dropping of an old consuming device
15 Connection of a new consuming device, if possible, the same power
16 Connection refused
17 Query: Priority of the new consuming device above minimum priority?
18 Raising of generator power
19 Current generator power
20 First consuming device (E-cat heating system)
21 Power dispersion: charging operation or heat conversion
22 Second consuming device
23 Third consuming device
24 Fourth consuming device

The invention claimed is:

1. A method of controlling an onboard power supply system for a motor vehicle having a multi-voltage generator which supplies at least a first and a second partial power supply system each having several electric consuming devices, the first and the second partial power supply system having a first and a second voltage respectively and being mutually coupled by way of a parallel connection consisting of a voltage converter and a longitudinal controller, the method comprising the acts of:

assigning a separate priority to each of the several electric consuming devices of the first and second partial power supplies;

receiving a signal directing the supply of electrical power to an unsupplied one of the electric consuming devices; and in response to the signal, calculating the total of the power currently supplied to the electric consuming devices from the generator and the power required by the unsupplied one of the consuming devices;

determining whether the assigned priority for the unsupplied one of the consuming devices is lower than a defined threshold priority value and upon a determination that the assigned priority of the unsupplied one of the consuming devices is lower than the defined threshold priority value and upon a determination that the calculated total of the power exceeds a defined power value of the generator, ceasing to supply at least one consuming load having an assigned priority lower than the unsupplied one of the consuming devices and supplying power to the unsupplied one of the consuming devices so that the total power supplied to the consuming devices by the generator does not exceed the defined power value of the generator.

2. The method according to claim 1, wherein the power value of the generator corresponds to the momentary power of the generator.

3. The method according to claim 1, further comprising: upon determining that the calculated total power is greater than the power value of the generator, and in response to a determination that the assigned priority of the unsupplied one of the consuming devices and the assigned priority of the consuming devices currently supplied by the generator are each greater than the defined threshold priority value, raising the power of the generator by at least one of the steps of boosting the generator,
adapting the rotational idling speed of the engine, and
boosting the voltage converter.

4. The method according to claim 1, wherein the priority of the consuming devices is dynamically defined as a function of driving and environmental parameters.

5. The method according to claim 4, wherein dynamically defining the priority of the consuming devices as a function of driving and environmental parameters includes:
  detecting a change in the operational condition of the motor vehicle; and
  changing the assigned priority of at least one of the electric consuming devices to be lower in comparison to a priority assigned another one of the consuming devices in response to the detected change in operating condition.

6. The method according to claim 4, wherein dynamically defining the priority of the consuming devices as a function of driving and environmental parameters includes:
  changing the assigned priority of at least one of the electric consuming devices to be higher than a priority assigned another one of the consuming devices in response to determining that a temperature of the environment of the motor vehicle is greater than a predetermined value.

7. A method of controlling an onboard power supply system for a motor vehicle having a multi-voltage generator which supplies at least a first partial power supply system with a first electric consuming device and a second partial power supply system having a second electric consuming device, the method comprising the acts of:
  dynamically assigning a separate priority to the first and second electric consuming devices, wherein dynamic assignment of separate priorities is peformed as a function of driving and environmental parameters;
  determining whether an amount of generated power is sufficient to supply both the first and second electric consuming devices; and
  supplying, when the amount of generated power is insufficient to supply both the first and second electric consuming devices, a selected one of the electric consuming devices and not supplying a remaining one of the consuming devices based on the respective assigned priority.

8. The method of claim 7, wherein the first partial power supply system includes a third electric consuming device and the second partial power supply system includes a fourth electric consuming device, and a separate priority is dynamically assigned to the first, second, third and fourth electric consuming devices, and when the amount of generated power is insufficient to supply the first, second, third and fourth electric consuming devices, the first second, third and fourth electric consuming devices are supplied based on the respective assigned priority.

9. The method of claim 7, wherein the determining and supplying acts are performed in response to connection of a new electric consuming device to the first or second partial power supply systems.

10. A method of controlling an onboard power supply system for a motor vehicle having a multi-voltage generator which supplies at least a first partial power supply system with a first electric consuming device and a second partial power supply system having a second electric consuming device, the method comprising the acts of:
  dynamically assigning a separate priority to the first and second electric consuming devices, wherein the first electric consuming device is connected to the first partial power supply system, and wherein dynamic assignment of separate priorities is performed as a function of driving and environmental parameters;
  determining that the second electric consuming device is connected to the second partial power supply system;
  determining whether an amount of generated power is sufficient to supply both the first and second electric consuming devices; and
  supplying, when the amount of generated power is insufficient to supply both the first and second electric consuming devices and the priority assigned to the second electric consuming device is greater than or equal to the priority assigned to the first electric consuming device, the second electric consuming device and not the first electric consuming device based on the respective assigned priority; and
  supplying, when the amount of generated power is insufficient to supply both the first and second electric consuming devices and the priority assigned to the first electric consuming device is greater than the priority assigned to the second electric consuming device, the first electric consuming device and not the second electric consuming device based on the respective assigned priority.

* * * * *